July 12, 1960
P. W. GREENE
2,944,269
METHOD OF MAKING A BEADED SHOE WELT
Filed March 19, 1958
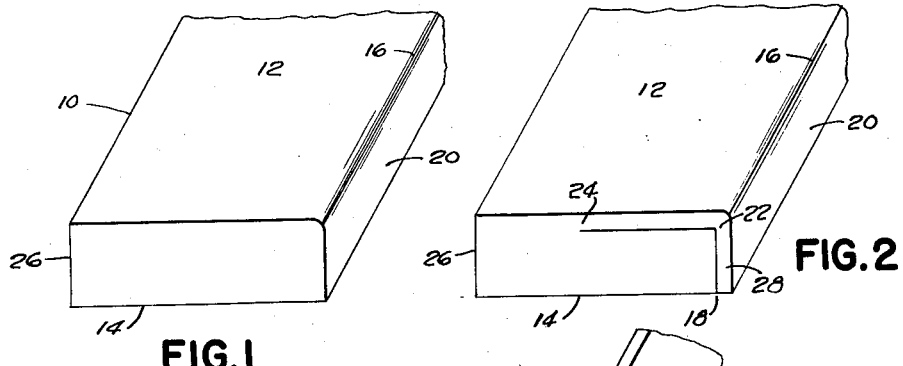
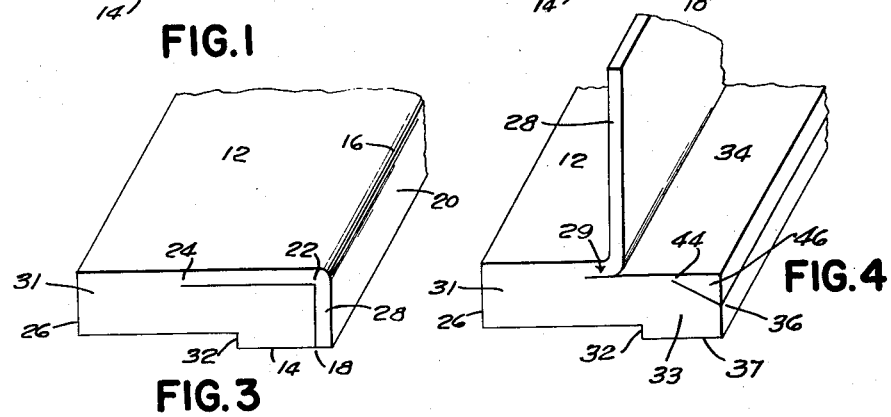
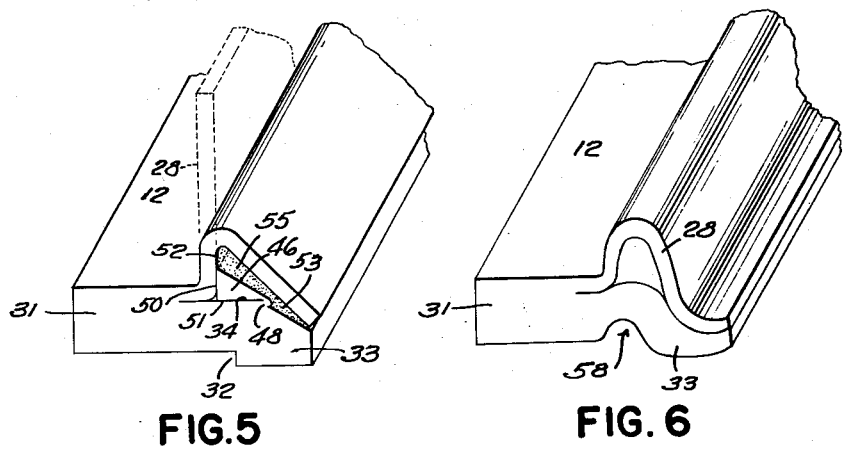
INVENTOR.
Percy W. Greene
BY Robert R. Churchill
ATTORNEY 2,944,269
Patented July 12, 1960

2,944,269

METHOD OF MAKING A BEADED SHOE WELT

Percy W. Greene, Whitman, Mass., assignor to Barbour Welting Company, Brockton, Mass., a corporation of Massachusetts Filed Mar. 19, 1958, Ser. No. 722,506

2 Claims. (Cl. 12—146)

This invention relates to a beaded shoe welting and to the method of making the same.

The invention has for a principal object to provide a novel and improved shoe welting which is characterized by novel structure which enables the welting to be constructed from a fillet of welting stock of a width substantially equal to the width of the finished beaded welt wherein a substantial saving in the cost of the welt stock is effected.

A further object of the invention is to provide a beaded shoe welting having novel provision for maintaining the bead in an upstanding position relative to the welt extension.

A still further object of the invention is to provide a novel and improved method of making the present beaded shoe welting in an efficient and economical manner.

With these general objects in view and such others as may hereinafter appear, the invention consists in the novel beaded welting and in the method of making the same hereinafter described and particularly defined in the claims at the end of this specification.

In the drawings illustrating the present invention:

Figs. 1 through 5 are perspective views illustrating the successive cutting, folding and molding steps in the formation of the present shoe welting; and Fig. 6 is a perspective view illustrating the finished beaded welting formed in accordance with the steps illustrated in Figs. 1 through 5.

In general the present invention contemplates a novel and improved beaded shoe welting and method of making the same, preferably from a unitary grain leather or other fillet. The present shoe welting and method of making the same enables the finished welt illustrated in Fig. 6 to be produced in an efficient and economical manner wherein substantial savings in welt stock is effected.

The present novel method of making the present beaded welting enables the finished welt to be manufactured from a fillet or strip of welt stock having a width substantially equal to that of the finished welt. In accordance with the preferred embodiment of the present invention a relatively thick strip or fillet of welt stock is cut to provide a relatively thin welt extension and a relatively thick inseam flange portion. A cover flap and core portion are incised from the fillet and folded to provide an upstanding bead. The welt is then molded to form the finished welt herein illustrated which is of a width equal to or may be slightly greater than that of the unfinished welt stock.

In order to illustrate the savings effected by the present invention in the cost of the welt stock utilized in the manufacture of the present welt, the welt is herein illustrated and described as being manufactured from a fillet or strip of welt stock ½" in width. Prior to the present invention in order to manufacture a beaded welt of the general type and width herein illustrated and described it was necessary to utilize a strip of welt stock $^{17}\!/_{32}"$ in width to produce a finished welt ½" wide. In other words in order to produce a finished welt of a given dimension it was necessary to start with a fillet of welt stock approximately $^{1}\!/_{32}"$ greater in width than the width of the finished welt. Thus, it will be apparent that a savings of approximately $^{1}\!/_{32}"$ in width of welt stock is effected by the present invention, and it may be seen that the savings thus effected are substantial considering the high cost of high grade welt stock and the hundreds of thousands of yards which may be produced.

Referring now to the drawings and particularly to Figs. 1 through 5, 10 represents a substantially rectangular leather fillet having a grain surface 12 and a flesh surface 14. As illustrated in Figs. 1 and 2, and in accordance with the preferred method of making the present welting, the corner 16 of the fillet is preferably rounded or skived, and an incision is made in the flesh surface 14 commencing at a point 18 spaced approximately $^{1}\!/_{32}"$ inwardly from the marginal edge 20. The incision is extended upwardly parallel to the marginal edge 20 to a point 22 disposed approximately $^{1}\!/_{32}"$ downwardly from the grain surface 12. The incision is then turned and extended substantially at right angles to its first direction parallel to the grain surface 12 terminating at point 24 spaced approximately ¼" inwardly from the other marginal edge 26 of the fillet 10. Thus, the cover flap 28 is formed from a portion of the marginal edge 20 and grain surface 12. The cover flap 28 is integral with and hingedly connected to the body of the fillet as indicated at 29 and defines the inner marginal edge of the grain surfaced welt extension 31. The next step in the formation of the present welt is to remove a relatively thin strip of stock from the flesh surface of the fillet adjacent marginal edge 26 as shown in Fig. 3. In this manner the thickness of the welt extension 31 is reduced and a relatively sharp shoulder 32 is provided in flesh surface 14 adjacent marginal edge 20. Shoulder 32 is preferably disposed approximately $^{5}\!/_{32}"$ inwardly from edge 20 and defines the inner edge of the relative thick inseam flange portion 33 as shown.

Referring now to Fig. 4, the cover flap 28 is folded upwardly, thereby exposing the surface 34 and the marginal edge of the underlying inseam flange portion. An incision is made commencing in the exposed portion of the marginal edge at 36 disposed substantially midway between the upper and lower surfaces 34, 37 of the inseam flange portion and is extended upwardly at an angle toward surface 34 terminating at 44 a short distance below surface 34, thereby forming a substantially triangular core member 46 integrally hinged in the upper portion of the inseam flange as indicated at 48.

In order to form the upstanding bead, the core member 46 is lifted and folded on hinged portion 48 such that its edge 50 is positioned firmly against the surface 52 of the cover flap 28 and its face 51 against surface 34 of the inseam flange portion. The elements forming the upstanding bead portion of the present welting are preferably secured firmly together by coating the contacting surfaces of the core, cover flap and inseam flange with a suitable adhesive of the type which may be readily found on the market and is commonly used in the welt manufacturing industry. The next step in the formation of the present welting consists in folding the cover flap 28 downwardly over the core 46 and securing the same firmly on the adhesively coated surfaces 53, 55. It will be observed that the marginal edges of the cover flap and inseam flange portion are secured flush with each other. It will be apparent from the foregoing description that the welt structure at the stage in its formation illustrated in Fig. 5 is of a width slightly less than the width of the fillet or strip of welt stock illustrated in Fig. 1.

In order to complete the formation of the finished welt illustrated in Fig. 6, the assembly of Fig. 5 is subjected to a molding operation of the type commonly utilized in the welt manufacturing industry, and during the molding operation a stitching groove 58 is molded into the flesh surface of the welt strip in the area defined by the shoulder 32. It will be observed that during the molding operation the inseam flange portion 33 is molded outwardly with the relation to the welt extension portion 31 a relatively short distance sufficient to increase the width of the finished welt to substantially that of the fillet illustrated in Fig. 1. The relatively thick inseam flange portion 33 provides sufficient welt stock to enable the finished inseam flange to be molded outwardly and further provides sufficient thickness and body in the area adjacent the stitching groove to provide the welt in this area with the strength necessary to hold the stitching and to enable the stitching to pull the welt tightly against the upper of the shoe in which it may be incorporated.

While it is preferred to produce the present novel beaded welting from a grain leather fillet, other suitable material may be used, and it is not desired to limit the invention to the use of grain leather welt stock.

From the foregoing description it will be apparent that the present novel beaded shoe welting is characterized by a structure providing an integral cover flap and core member which are incised from the body of the fillet or strip of welt stock in a manner to provide a finished welt which is substantially the same width as a strip of welt stock from which the finished welting is made. It will be apparent that this results in a substantial saving of welt stock and, therefore, enables the present welting to be produced in an efficient and economical manner.

While the preferred embodiment of the invention has been herein illustrated and described, it will be understood that the invention may be embodied in other forms within the scope of the following claims.

Having thus described the invention, what is claimed is:

1. The method of making a beaded shoe welt having an inseam flange along one of its marginal edges and a welt extension along its other marginal edge from a relatively thick fillet of welt stock which comprises the steps of providing a flap in the body of the fillet, one end of the flap being cut from the marginal edge of the fillet which will be the inseam flange of the finished welt and the other end of the flap being integral with the body of the fillet, removing a strip from the fillet underlying the portion of the fillet which will be the welt extension in the finished welt to thereby reduce the thickness thereof and to form a shoulder adjacent the marginal edge which is to be the inseam flange, providing a core member in the body of the fillet, folding a portion of the flap over the core and securing the remaining portion of the flap to the surface of the fillet along the marginal edge which is to be the inseam flange in the finished welt to form an upstanding bead, a welt extension and an inseam flange, and then molding the inseam flange laterally to increase the width of the welt.

2. The method of making a beaded shoe welt having an inseam flange and a welt extension from a fillet of welt stock comprising the steps of making an incision in the flesh surface of the fillet adjacent the marginal edge of the fillet which is to be the inseam flange in the finished welt and extending the same upwardly parallel to said marginal edge to a point spaced a short distance below the upper surface of the fillet, extending said incision parallel to said upper surface toward the other marginal edge of the fillet which is to be the welt extension in the finished welt to a point substantially midway between the marginal edges of the fillet to form an elongated flap having one end integral with said upper surface, removing a relatively thin strip from the body of the fillet underlying portion of the welt which is to be the welt extension to reduce the thickness thereof, folding said flap upwardly to expose the underlying surface of the fillet, making an incision in the marginal edge of the fillet underlying said flap substantially midway between the upper and lower surfaces of the fillet and extending the same upwardly at an angle to a point spaced a short distance below said upper surface to thereby form a substantially triangular core member hingedly connected in said upper surface, folding said core member under said flap, folding a portion of the flap over said core member and applying the other portion thereof to the portion of the marginal edge which is to be the inseam flange to provide an upstanding bead portion in the upper surface of the fillet, and molding the assembly to form a stitching groove in the bottom surface thereof and to slightly increase the width of the inseam flange.

References Cited in the file of this patent

UNITED STATES PATENTS

| | | |
|---|---|---|
| 2,153,321 | Vizard | Apr. 4, 1939 |
| 2,241,652 | Vizard | May 13, 1941 |
| 2,247,456 | Vizard | July 1, 1941 |
| 2,299,263 | Vizard | Oct. 20, 1942 |
| 2,754,600 | Vizard | July 17, 1956 |
| 2,763,879 | Gemme | Sept. 25, 1956 |
| 2,775,829 | Vizard | Jan. 1, 1957 |